US005293483A

United States Patent [19]

Mizobata

[11] Patent Number: 5,293,483

[45] Date of Patent: Mar. 8, 1994

[54] COMBINED IMAGE AND CONTROL DATA IMAGE MEMORY DEVICE

[75] Inventor: Norihiko Mizobata, Habikino, Japan

[73] Assignee: Matsushita Electric Industrial Co., Ltd., Osaka, Japan

[21] Appl. No.: 800,814

[22] Filed: Nov. 29, 1991

[30] Foreign Application Priority Data

Nov. 30, 1990 [JP] Japan .................................. 2-340461

[51] Int. Cl.$^5$ .............................................. G06F 15/20

[52] U.S. Cl. ................................ 395/164; 365/189.01

[58] Field of Search ............... 395/164, 166, 400, 162, 395/425; 340/799, 723, 798, 748, 721; 364/200 MS File, 900 MS File; 365/189.01, 230.01, 189.04, 230.09, 230.04

[56] References Cited

U.S. PATENT DOCUMENTS 4,646,077 2/1987 Culley ................................ 340/748

4,857,899 8/1989 Ishii .................................... 340/701

4,928,253 5/1990 Yamauchi et al. .................. 395/166

*Primary Examiner*—Dale M. Shaw

*Assistant Examiner*—Kee M. Tung

*Attorney, Agent, or Firm*—Renner, Otto, Boisselle & Sklar

[57] ABSTRACT

Two or more image data memories receive an image address signal and a image data signal. When the image address signal indicates writing of an image data and writing address, an image data stored at the writing address is specified by the image address signal. When the image address signal indicates reading an image data and reading address, an image data is read out from the reading address specified by the image address signal to be output. When the image address signal indicates writing of an image data and writing address, a first control data memory stores a process control data at the writing address specified by the image address signal, and sequentially outputs stored process control data as a process control data output signal. When the image address signal indicates writing a data into one of the image data memories, a second control data memory outputs a stored process control data, and stores a process control data when the image address signal indicates writing a data into the first control data memory. An image processor processes image data in accordance with the process control data output signal, and outputs a processed image data.

12 Claims, 7 Drawing Sheets

COMBINED IMAGE AND CONTROL DATA IMAGE MEMORY DEVICE

BACKGROUND OF THE INVENTION

1. Field of the Invention

The present invention relates to an image data memory device useful in a computer system, and more particularly to an image data memory device comprising a plurality of image memories.

2. Description of the Prior Art

FIG. 6 shows a prior art image data memory device capable of storing image data together with process control data added to the respective data. Hereinafter, process control data are often referred to merely as "control data".

The image data memory device shown in FIG. 6 comprises two image data memories 62 and 63, and an image processor 64. In the image data memories 62 and 63, using an image data signal *6b*, image data can be written to and read from the coordinates specified by an image address signal *6a* output from a central processing unit 61. The image processor 64 receives image output signals *6c* and *6d* from the respective image data memories 62 and 63, and performs the processing dictated by a control data output signal *6e* contained in the image output signal *6c*, on the image data entered by way of the image output signals *6c* and *6d*. The processing result is output as a processed image signal *6f* which is supplied to a suitable display apparatus (not shown) through a display controller 65. In this configuration, the image date and the control data associated with each pixel of the image data are stored in one of the image data memories 62 and 63 (in this example, in the image data memory 62).

When the image data memory 62 can store n-bit data for every pixel, m bits out of the n bits ($m<n$) are assigned for storing the control data, thus storing together the image data and control data. The m bits in the n-bit image output signal *6c* are supplied as the control data output signal *6e* to the image processor 64 to control the image processing. In the image data memory 62, as shown in FIG. 7, m bits out of the n bits of data that can be stored at one address are assigned to the control data. Therefore, when writing data to the image data memory 62, date created by combining the image data with the control data associated with the image data is written into the image data memory 62 by specifying the coordinates using the image address signal *6a*.

FIG. 8 shows another prior art image data memory device. The image data memory device shown in FIG. 8 comprises two image data memories 82 and 83, a control data memory 84, and an image processor 85. In the image data memories 82 and 83, using an image data signal *8b*, image data can be written to and read from the coordinates specified by an image address signal *8a* supplied from a central processing unit 81. In the control data memory 84, using the image data signal *8b*, a control data can be written to and read from the coordinates specified by the image address signal *8a* supplied from the central processing unit 81. The image processor 85 receives image output signals *8c* and *8d* from the image data memories 82 and 83, and a control date output signal *8e* from the control data memory 84. The image processor 85 performs the processing dictated by the control data output signal *8e* on each pixel of image data entered by way of the image output signals *8c* and *8d*, and outputs the processing result as a processed image signal *8f* which is supplied to a suitable display apparatus (not shown) through a display controller 86.

As shown in FIG. 9, the image data memories 82 and 83 and the control data memory 84 have independent address spaces. In the example shown in FIG. 9, the image data memories 82 and 83 store 32 bits per pixel and the control data memory 84 stores 2 bits per pixel. To write an image data and the associated control data, first the coordinates at which the image data is stored (i.e. one of the addresses assigned to the image data memory 82 or 83 (Oh-3fffffh or 4000OOh-7ffffh)) are specified using the image address signal *8a*, and the image data supplied via the image data signal *8b* is written to the specified coordinates. Thereafter, the corresponding coordinates (800000h-81fffh) in the control data memory 84 are specified using the image address signal *8a*, and the control data supplied via the image data signal *8b* is written to the specified coordinates. Writing image data to the image data memories 82 and 83 and writing a control data to the control data memory 84 are thus performed sequentially and independently of each other.

Such prior art image data memory devices have drawbacks which will be described below.

In the image data memory device of FIG. 6, it is assumed that the image data memory 62 can store 8-bit data (256 colors) for each pixel (i.e., $n=8$). If two bits (providing four varieties) are needed for storing the control data for each pixel, two bits out of the eight bits must be assigned for storing the control data in the image data memory 62 (i.e., $m=2$), leaving six bits (64 colors) available for the image data for one pixel. Accordingly, the number of colors available for image display decreases. Furthermore, each time the need arises to write an image data into the image data memory 62 at the coordinates specified by the image address signal *6a*, it is necessary to create the image data signal *6b* by combining the image data and the control data, thus requiring extra processing. Moreover, when it is desired to read out or write only the control data, the image data, which is not the object of readout or writing, must be read out or written simultaneously with the control data. More specifically, when reading out, the data at the specified coordinates is read out from the image data memory 62, and the control data portion must be extracted from the read-out data, and when writing, first the image data is read out from the image data memory 62, and then the control data to be written is substituted into the control data portion of the read-out image data and the data thus rewritten is then put back into the image data memory 62. As described, even when reading out or writing only the control data, the image data must always be read out and the control data must be separated from or substituted into the image data, thus increasing the processing time.

In the image data memory device of FIG. 8, writing an image data into the image data memories 82 and writing the control date assigned to the image data are performed as described below. First, the image data entered via the image data signal *8b* is written into the image data memory 82 at the coordinates specified by the image address signal *8a*. Next, the control data entered via the image data signal *8b* is written into the control data memory 84 at the same coordinates specified by the image address signal *8a*. Thus, two writing processes, one to the image data memory 82 and one to the control data memory 84, are required for every writing of an image data. Therefore, the read/write software for an image data memory of this configuration becomes complicated since it must manage the coordinates in both the image data memories 82 and 83 and the control data memory 84, i.e., such software must perform the clipping of the drawing area or the like in processing.

When an image data and a control data corresponding thereto are moved within the image data memory device of FIG. 8, there arises the following problem. It is assumed that the image data memories 82 and 83 and the control data memory 84 stores image data and control data as shown in (a) of FIG. 10, respectively, and that, as a result of the process of the image processor in accordance with the control data stored in the rectangular area of the control data memory 84, the rectangular area of the image data memory 83 is displayed as shown by the reference numeral 104 in (a) of FIG. 10. Namely, the control data stored in the control data memory 84 indicates that in the rectangular area the image data stored in the image data memory 83 is to be displayed. When the rectangular area of the display 104 is to be moved, both the rectangular areas of the image data memory 83 and control data memory 84 are moved so that the image data moved in the image data memory 83 remain to be displayed after this moving process.

This moving process in the prior art will be described with reference to FIG. 10 in which numerals 101, 102, 103 and 104 respectively indicate the contents of the memories 82–84 and the display. First, the image data stored in the rectangular area of the image data memory 83 are moved. As a result of this movement, the contents of the memories 83 and 84 are changed as shown by reference numerals 102 and 103 in (b) of FIG. 10. As shown by numeral 104 in (b) of FIG. 10, the contents of the image date memory 83 come to disagree with those of the control data memory 84, resulting in that the image on the way of moving data appears on the display. Then, the control data stored in the rectangular area of the control data memory 84 are moved as shown in the block 103 of (c) of FIG. 10, and the display becomes as shown in the block 104 of (c) of FIG. 10 to indicate the image data in the rectangular area in the image data memory 83, thereby completing the movement of the image data and the change of the displayed position of the image data in the display. In this way, in the course of moving image data and control data corresponding thereto, the displayed contents disagree with the contents of the control data memory 84.

SUMMARY OF THE INVENTION

The image data memory device of this invention, which overcomes the above-discussed and numerous other disadvantages and deficiencies of the prior art, can be used in a computer system in which an image address signal and an image data signal are generated, and comprises: a plurality of image data storing means for receiving said image address signal and said image data signal, and for, when said image address signal indicates writing of an image data and writing address, storing an image data on said image data signal at said writing address specified by said image address signal, and for, when said image address signal indicates reading an image data and reading address, reading out an image data from said reading address specified by said image address signal, and outputting said read out image data as an image data output signal; first control data storing means for receiving said image address signal, and for, when said image address signal indicates writing of an image data and writing address, storing a process control data on a process control data signal at said writing address specified by said image address signal, and for sequentially outputting stored process control data as a process control data output signal; second control data storing means for receiving said image address signal and said image data signal, and for storing at least one process control data, and for, when said image address signal indicates writing a data into one of said image data storing means, outputting a stored process control data as said process control data signal, and for, when said image address signal indicates writing a data into said first control data storing means, storing a process control data on said image data signal; and image processing means for receiving said image data output signals from said plurality of image data storing means, and said process control data output signal, and for processing image data on said image data output signals in accordance with the contents of said process control data output signal, and for outputting a processed image data as a processed image data signal.

In another aspect of the invention, the image data memory device comprises: a plurality of image data storing means for receiving said image address signal and said image data signal, and for, when said image is address signal indicates writing of an image data and writing address, storing an image data on said image data signal at said writing address specified by said image address signal, and for, when said image address signal indicates reading an image data and reading address, reading out an image data from said reading address specified by said image address signal, and outputting said read out image data as an image data output signal; first control data storing means for receiving said image address signal, and for, when said image address signal indicates writing of an image data and writing address, storing a process control data on a process control data signal at said writing address specified by said image address signal, and for, when said image address signal indicates reading of an image data and reading address, reading out a process control data from said reading address, and for outputting said read out process control data as a process control data output signal and process control data signal; second control data storing means for receiving said image address signal and said image data signal, and for storing at least one process control data, and for, when said image address signal indicates writing a data into one of said image data storing means, outputting a stored process control data as said process control data signal, and for, when said image address signal indicates writing a data into said first control data storing means, storing a process control data on said image data signal, and for, when said image address signal indicates reading of an image data and reading address, storing a process control data on said process control data signal; and image processing means for receiving said image data output signals from said plurality of image data storing means, and said process control data output signal, and for processing image data on said image data output signals in accordance with the contents of said process control data output signal, and for outputting a processed image data as a processed image data signal.

In the above configurations, said image address signal and image data signal may be generated by a central processing unit of the computer system.

In the above configurations, said image data memory device may further comprise display control means for receiving said processed image data signal, and for converting said processed image data signal into a control signal suitable for a display apparatus, and for outputting said control signal.

In the above configurations, said image processing means may add two or more received image data output signals at the ratio indicated by said process control data output signal, and output the result as said processed image data signal.

In the above configurations, said image processing means may select one of two or more received image data output signals in accordance with said process control data output signal, and output the selected image data output signal as said processed image data signal.

Thus, the invention described herein makes possible the objectives of:

(1) providing an image data memory device in which writing of an image data and that of a corresponding control data can be simultaneously performed;

(2) providing an image data memory device in which writing of a control data into a control data memory can be performed independently from that of a corresponding image data into an image data memory; and (3) providing an image data memory device in which it is easy to manage a control data memory.

According to one aspect of the invention, when an image data and a control data corresponding to the image data are to be respectively stored into one of the image data storing means and the first processing control data storing means, first the central processing unit of a computer system outputs the desired control data onto the image data signal, and the image address signal is issued to direct data writs to the second control data storing means, thus storing the control data into the second control data storing means. Next, the central processing unit outputs image date onto the image data signal and writes it into the image data storing means by specifying the address (coordinates) by the image address signal. At this time, the same image address signal indicating the destination coordinates of the image data and the control data signal representing the control data stored in the second control data storing means are supplied to the first control data storing means, so that the control data is written into the first control data storing means at the same time that the image data is written into the image data storing means.

When successively writing image data assigned with the same control data, it is not necessary to rewrite the same control data into the second control data storing means, but by successively writing the image data, the control data is automatically assigned to the image data and written into the first control data storing means at the same coordinates as where the image data is written.

By using the control data thus written in the first control data storing means, the image data stored in the plurality of image data storing means are arithmetically processed on a pixel-by-pixel basis as described below. Data are sequentially read out, pixel by pixel, from the plurality of image data storing means and from the first control data storing means, data at the lame coordinates being read out simultaneously, and the thus read-out data are output on the image output signals and the control data output signal, respectively. These signals are fed to the image processing means. The image processing means is capable of performing arithmetic processing of the image data supplied via the plurality of image output signals. The image processing means may have a plurality of arithmetic functions, the function to be performed being selected for each pixel according to the supplied control data output signal. Thus, the arithmetic processing between the image data supplied via the plurality of image output signals can be performed by selecting the type of operation for each pixel. The operation result is output from the image processing means onto the processed image signal to supply to the display control means for conversion into a control signal suitable for use in an image display apparatus.

When an image data is to be moved in the image data storing means with being assigned with a new given control data, the central processing unit outputs the control data onto the image data signal, and directs writing in the second control data storing means via the image address signal, thereby writing the control data into the second control data storing means. Then, the address is specified by the image address signal output from the central processing unit, so that the image data is read out from the image data storing means. The image data is input via the image data signal into the central processing unit.

Then, the central processing unit outputs the destination coordinates as the image address signal. At the same time, the read out image data is input to the image data storing means via the image data signal. The read out image data is written into the destination coordinates. The contents of the second control data storing means (i.e., the control data newly assigned to the image data) is input as the control data signal to the first control data storing means, and stored at the same coordinates as the image data. The successive movement of an image data can be accomplished only by repeating reading of the image data from the image data storing means and writing of the image data into the image data storing means. Therefore, even when image data are continuously moved, control data can be changed to new given control data without considering the first control data storing means.

In another aspect of the invention, when an image data is moved in the same image data storing means while keeping the image data to be assigned with the same control data, the following operations are performed, the central processing unit specifies the coordinates via the image address signal, and the image data is read out from the image data storing means. In this case, the image data is input as the image data signal to the central processing unit, the same address signal is input to the first control data storing means, the control data assigned to the image data is read out from the first control data storing means and input as the control data signal to the second control data storing means to be stored therein. Next, at the same time the central processing unit outputs the destination coordinates on the image address signal, the read out image data is input via the image data signal to the image data memory means so that the read out image data is written at the destination coordinates. Simultaneously, the first control data storing means receives as the control data signal the contents of the second control data storing means (i.e., the control data assigned to the image data) which are then stored at the same coordinates as the image data. Therefore, even when image data are continuously moved, control data can be moved without considering the first control data storing means.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
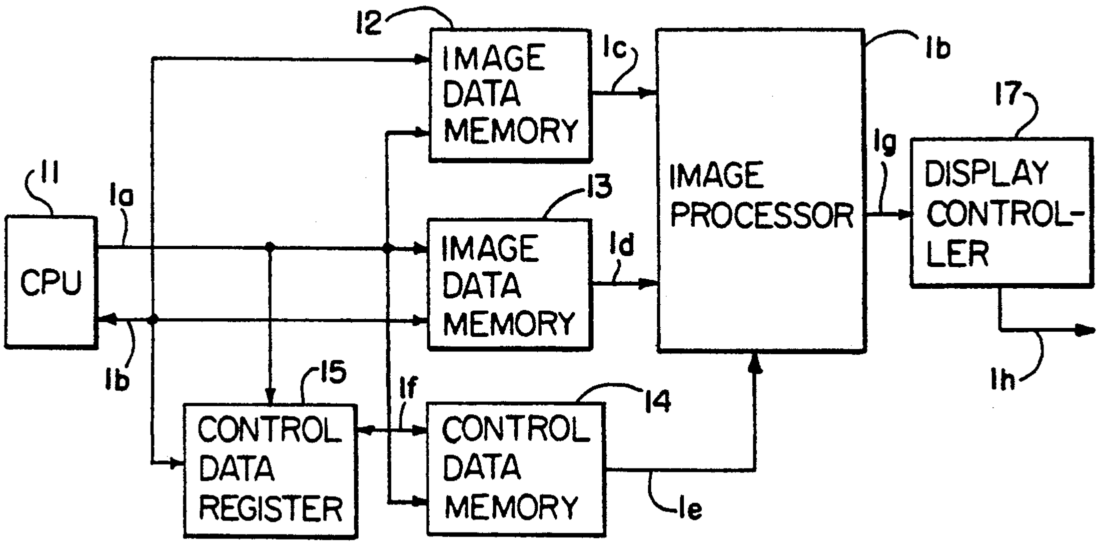
FIG. 1 is a block diagram illustrating an image data memory device according to the invention.

FIG. 1 illustrates an image data memory device according to the invention. The image data memory device of FIG. 1 receives an image address signal 1*a* and an image data signal 1*b* from a central processing unit 11, and comprises two image data memories 12 and 13, a control data memory 14, a control data register 15, and an image processor 16.

In the image data memories 12 and 13, when the image address signal 1*a* is received which directs image data write and specifies the write coordinates, an image data entered via the image data signal 1*b* is written at the specified coordinates. In contrast, when the image address signal 1*a* is received which directs image data read and specifies the read coordinates, an image data is read out from the specified coordinates and is output onto the image data signal 1*b*, while the stored image data are sequentially read out pixel by pixel to be output onto image output signals 1*c* and 1*d*.

In the control data memory 14, when the image address signal 1*a* is received which directs image data write and specifies the write coordinates, a control data entered via a control data setting signal 1*f* is written at the specified coordinates, and, when the image address signal 1*a* is received which directs image data read and specifies the read coordinates, a control data is read out from the specified coordinates to be output onto the control data setting signal 1*f*, while the stored control data are sequentially read out pixel by pixel to be output onto a control data output signal 1*e*.

The control data register 15 performs various functions depending upon the image address signal 1*a*, as described below. When the image address signal 1*a* directs data write to the image data memories 12 and 13, the control data register 15 outputs the stored control data onto the control data setting signal 1*f*. When the image address signal la directs data read from the image data memories 12 and 13, the control data register 15 reads the control data supplied via the control data setting signal 1*f* and stores the thus supplied control data. When the image address signal 1*a* directs data write to the control data memory 14, the control data register 15 directly outputs the control data supplied via the image data signal 1*b* onto the control data setting signal 1*f*. When the image address signal 1*a* directs data read from the control data memory 14, the control data register 15 directly outputs the control data supplied via the control data setting signal 1*f* onto the image data signal 1*b*. When the image address signal 1*a* directs data write to the control data register 15, the control data register 15 stores the control data supplied via the image data signal 1*b*. when the image address signal 1*a* directs data read from the control data register 15, the control data register 15 outputs the stored control data onto the image data signal 1*b*.

The image processor 16 receives the image output signals 1*c* and 1*d* from the image data memories 12, 13 and the control data output signal 1*e* from the control data memory 14, and performs the arithmetic processing dictated by the control data output signal 1*e* on the image data supplied via the image output signals 1*c* and 1*d* from the image data memories 12 and 13 on a pixel-by-pixel basis. The processing result is output as a processed image signal 1*g* to a display controller 17. The display controller 17 converts the digital image data signal supplied via the processed image signal 1*g* into a control signal suitable for use in an image display apparatus.

Each of the image data memories 12 and 13 can store 1024×1024 pixels, each pixel comprising 32-bit data. The control data uses three bits per pixel. The control data memory 14 has a memory capacity that can store 3-bit control data for 1024×1024 pixels. Depending upon the control data on the control data output signal 1*e*, the image processor 16 performs the processing shown in Table 1 below, on the image data simultaneously supplied from the image data memories 12 and 13 via the image output signals 1*c* and 1*d*. In Table 1, (1*c*) and (1*d*) respectively designate image data input via image output signals 1*c* and 1*d*.

TABLE 1

| Control Data | Processing |
|---|---|
| 0 | Select (1c) |
| 1 | Select (1d) |
| 2 | OR of (1c) and (1d) |
| 3 | AND of (1c) and (1d) |
| 4 | ADD of (1c) and (1d) at the ratio of 1:2 |

Figure 2:
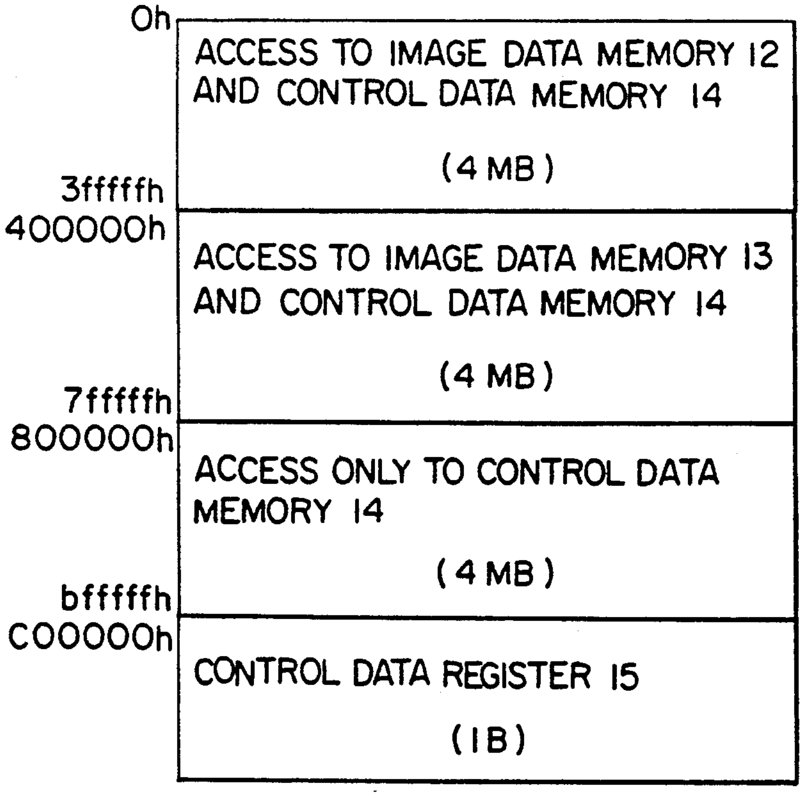
FIG. 2 is a memory map of the image data memory device of FIG. 1.

The image data memory device of the embodiment has the address map shown in FIG. 2 for read/write operations from the central processing unit 11.

The operation of the image data memory device of the embodiment will be described.

Figure 3:
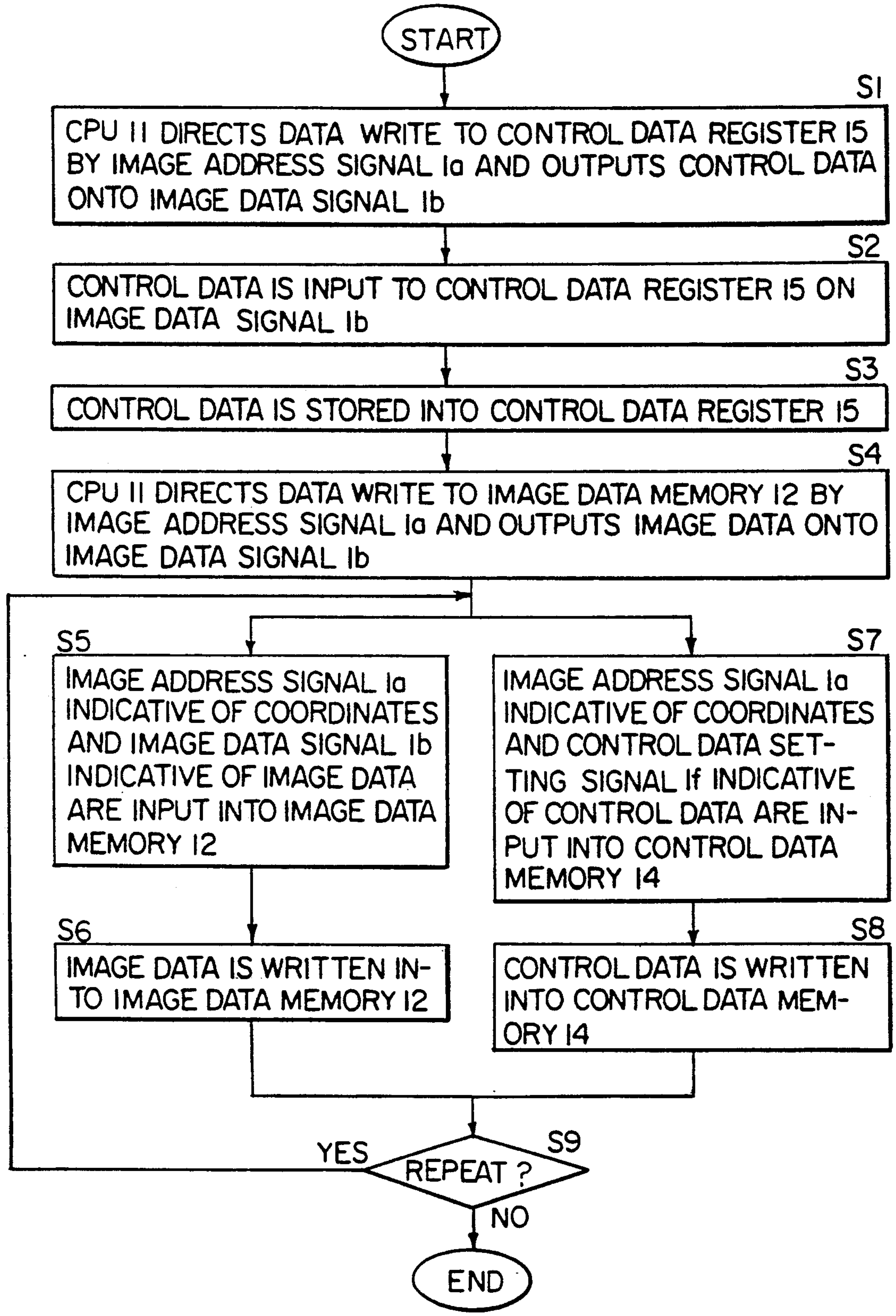
FIGS. 3 and 4 are flow charts illustrating the operation of the image data memory device of FIG. 1.

1. A Control Data is Assigned to Image Data and the Image Data is Stored into the Image Data Memory 12 (FIG. 3)

First, the central processing unit 11 outputs a desired control data (e.g., "1") onto the image data signal 1*b* and address c00000h onto the image address signal 1*a* to direct data write to the control data register 15 (step S1). The control data "1" assigned to the image data to be written is thus stored into the control data register 15 (steps S2 and S3). Next, in step S4, the central processing unit 11 outputs the image data onto the image data signal 1*b* and the destination coordinates (e.g., address 100000h) onto the image address signal 1*a*, thereby writing the image data into the image data memory 12 (steps S5 and S6). At this time, the same image address signal 1*a* (100000h) that indicates the destination coordinates of the image data, and the control data setting signal 1*f* representing the control data "1" stored in the control data register 15 are supplied to the control data memory 14, so that the control data is written into the control data memory 14 at the same time that the image data is written into the image data memory 12 (steps S7 and S8). When successively writing image data having the same control data, it is not necessary to rewrite the same control data into the control data register 15, but by successively writing the image data, the control data is automatically assigned to the image data and written into the control data memory 14 at the same coordinates as where the image data is written.

Figure 4:
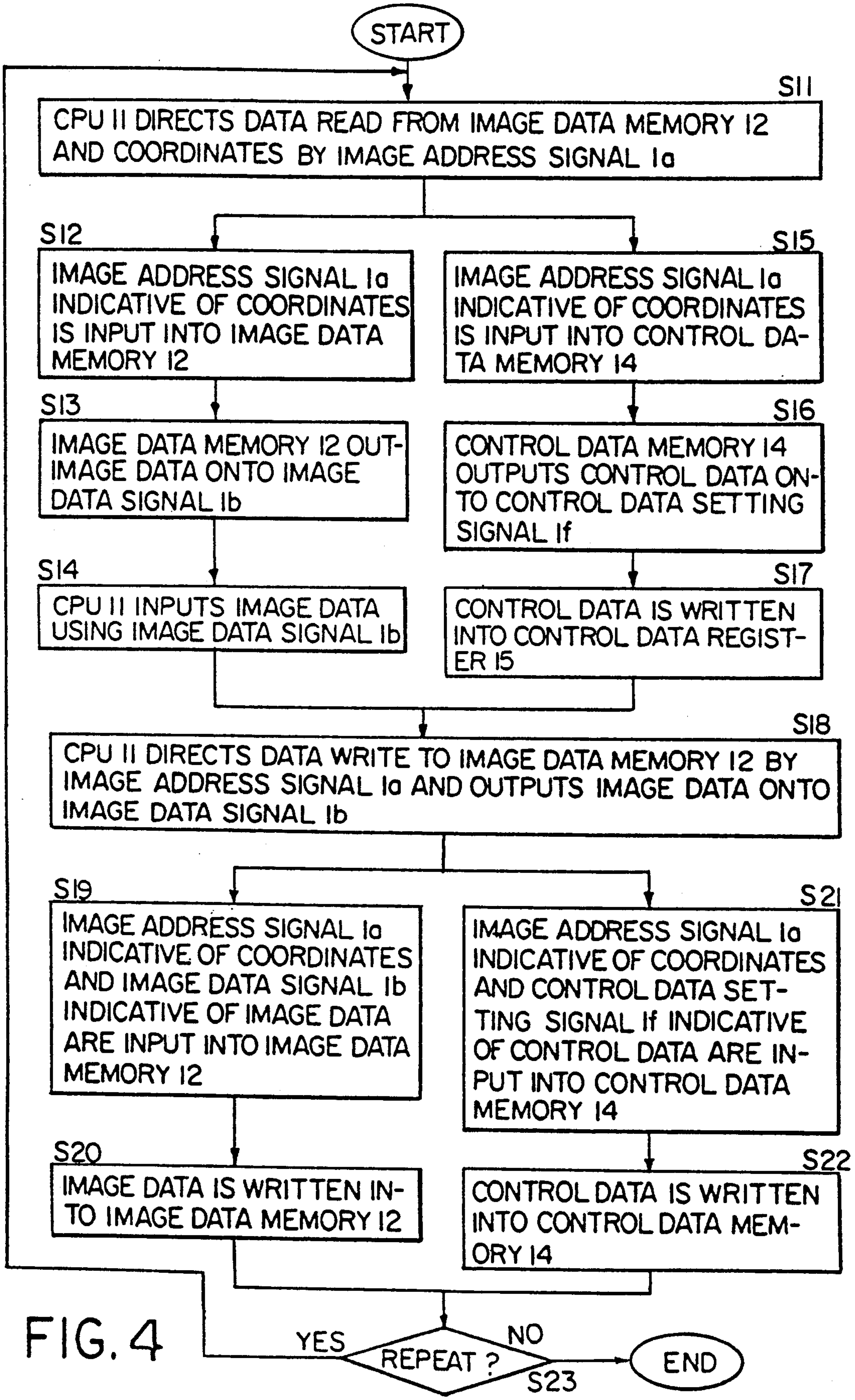

2. An Image Data is Moved Together With Its Control Data Within the Image Data Memory 12 (FIG. 4)

First, coordinates (e.g., address 200000h) are specified by the image address signal 1*a* issued from the central processing unit 11 (step S1) so that an image data (e.g., 12345678h) is read out of the image data memory 12. The image data (12345678h) is output onto the image data signal 1*b* and loaded into the central processing unit 11 (steps S12–S14). The same image address signal 1*a* (200000h) is also supplied to the control data memory 14 so that a control data (e.g., "2") assigned to the image data is read out from the control data memory 14 and entered into the control data register 15 via the control data setting signal 1*f* (steps S15–S17). The control data "2" is thus stored into the control data register 15. Next, the central processing unit 11 outputs the destination coordinates (e.g., 300000h) onto the image address signal 1*a*, while outputting the previously loaded image data (12345678h) onto the image data signal 1*b* to input to the image data memory 12 (step S18), so that the image data (12345678h) is written to the destination coordinates (steps S19 and S20). At the same time, the contents of the control data register 15, i.e. the control data "2" assigned to the previously read-out image data, and the destination coordinates (300000h) are entered to the control data memory 14 via the control data setting signal 1*f* and the image address signal 1*a*, respectively, so that the control data "2" is written at the same coordinates (300000h) as where the image data is written (steps S21 and S22). In this way, when successively moving image data, the control data can be moved together with the image data without having to consider the control data memory 14.

3. An Image Data is Read Out and a Control Data is Assigned to the Image Data

First, coordinates (e.g., address 100000h) are specified by the image address signal 1*a* issued from the central processing unit 11 so that image data is read out of the image data memory 12. The image data is output onto the image data signal 1*b* and loaded into the central processing unit 11. The same image address signal 1*a* (100000h) is also supplied to the control data memory 14 so that the control data (e.g., "1" ) assigned to the image data is read out of the control data memory 14 and entered into the control data register 15 vis the control data setting signal 1*f*. The control data "1" is thus stored into the control data register 15. Next, using the image address signal 1*a*, the central processing unit 11 directs data read from the control data register 15 (i.e. outputs c00000h on the image address signal 1*a*) so that the control data "1" stored in the control data register 15 is read out. In this way, the image data and the control data assigned to the image data can be read out.

4. Writing Only the Control Data Assigned to Image Data

Using the image address signal 1*a*, the central processing unit 11 directs data write to the control data memory and specifies the write coordinates (e.g., address 900000h). At the same time, the control data (e.g., "3") to be written is specified via the image data signal 1*b*. As seen from the memory map of FIG. 2, address 900000h indicates data read/writs on the control data memory 14, and since the starting address of the control data memory is 800000h, points to the address of the control data memory 14 at which the control data assigned to the image data at address 100000h of the image data memory 12 is stored. The image address signal 1*a* is input to the control data memory 14, and the image data signal 1*b* to the control data register 15. When data write to the control data memory 14 is directed by the image address signal 1*a*, the data supplied to the control data register 15 via the image data signal 1*b* is transferred onto the control data setting signal 1*f* to be input into the control data memory 14. The control data "3" is thus written into the control data memory 14 at the specified coordinates.

5. Reading Out the Control Data Assigned to Image Data

Using the image address signal 1*a*, the central processing unit 11 directs data read from the control data memory 14 and specifies the read coordinates (e.g., address 900000h). The image address signal 1*a* is input to the control data memory 14 which in turn outputs the control data (e.g., "3") of the specified coordinates onto the control data setting signal 1*f*. When data read from the control data memory 14 is directed by the image address signal 1*a*, the control data register 15 directly outputs the contents of the control data setting signal 1*f* onto the image data signal 1*b*, so that the control data "3" of the coordinates specified for data read is loaded into the central processing unit 11 by way of the image data signal 1*b*. The control data can thus be read out from the specified coordinates within the control data memory 14.

By implementing the above operations, when successively writing image data with the same control data into the image data memory or when moving image data together with its control data within the image data memory, the control data can be written into the control data memory 14 at the same time the image data is written into the image data memory 12 or 13. This eliminates the reduction of drawing speed caused by the operation of writing the control data to the control data memory 14. Since read/write operations can be performed with respect to the proper coordinates in the control data memory 14 only by reading out or writing in the image data, the configuration of this embodiment serves to simplify software management of the control data memory (for example, clipping of the image drawing area). Furthermore, since the control data memory is provided separately from the image data memory, the problem of reducing the number of colors available for image display can also be avoided. Moreover, since the central processing unit is capable of accessing the control data memory and the image data memory independently of each other for read/write operations, read/-write of the control data only can be achieved by a simple procedure.

Figure 5:
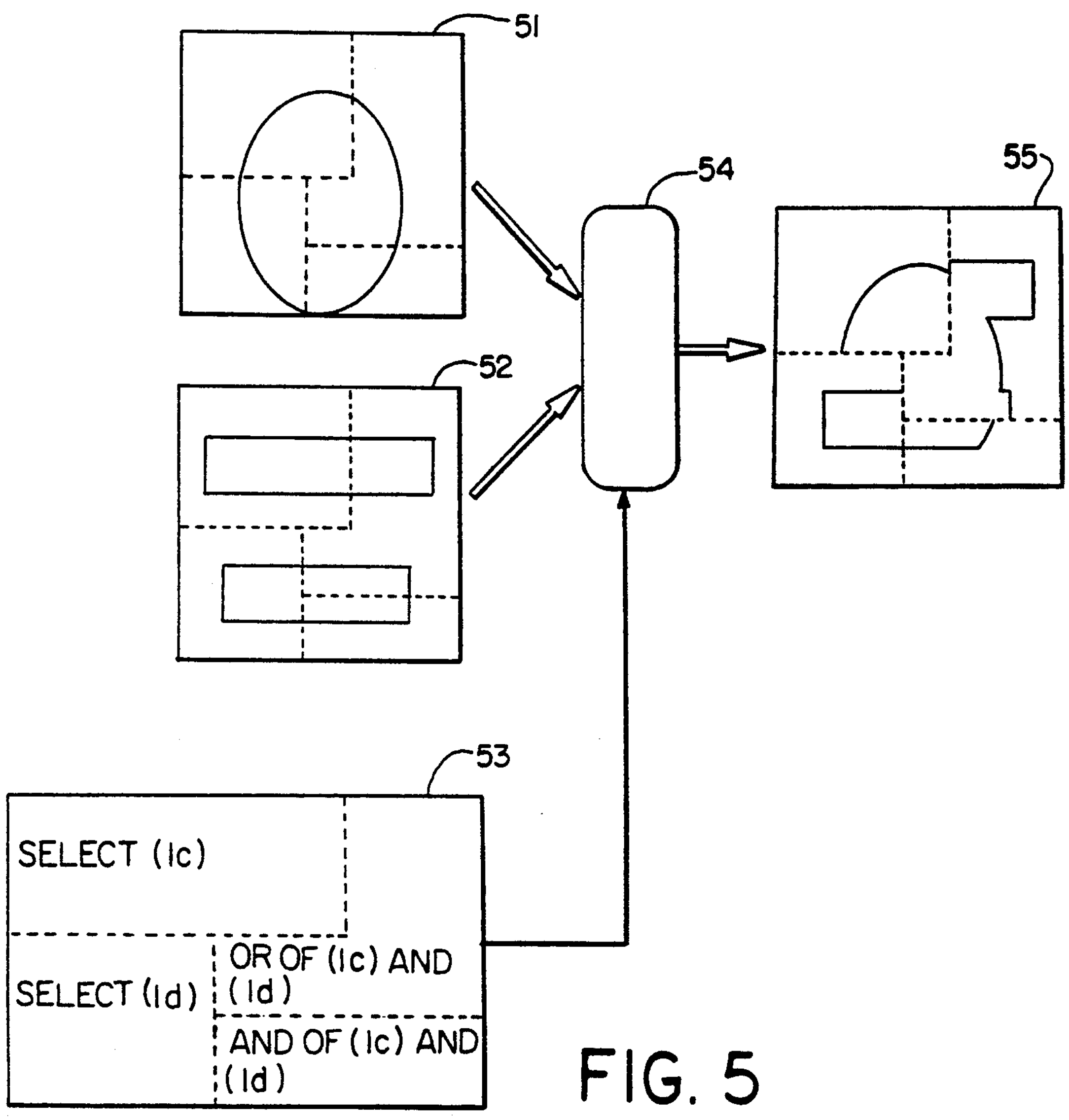
FIG. 5 is a diagram illustrating the image processing in the image data memory device of FIG. 1.
Figure 6:
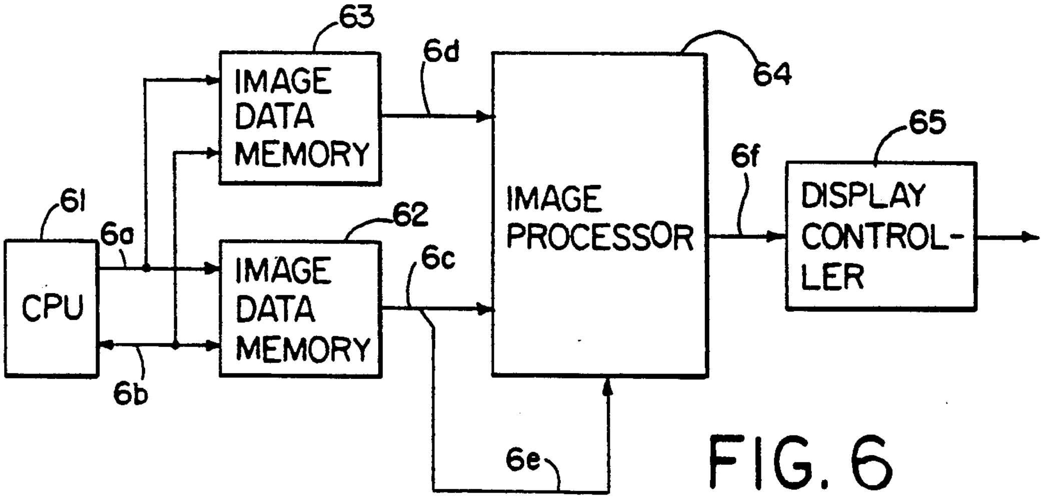
FIG. 6 PRIOR ART
FIG. 6 is a block diagram illustrating a prior art image data memory device.
Figure 7:
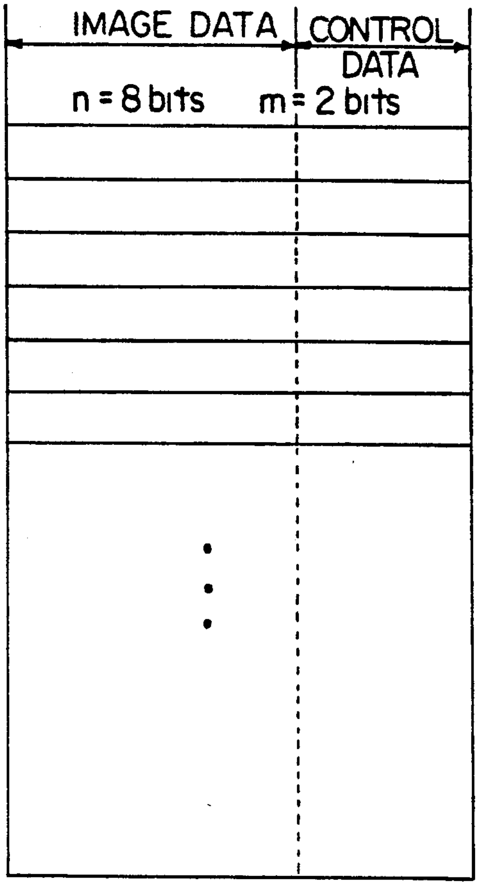
FIG. 7 PRIOR ART
FIG. 7 is a diagram illustrating the memory allocation in the prior art image data memory device of FIG. 6.
Figure 9:
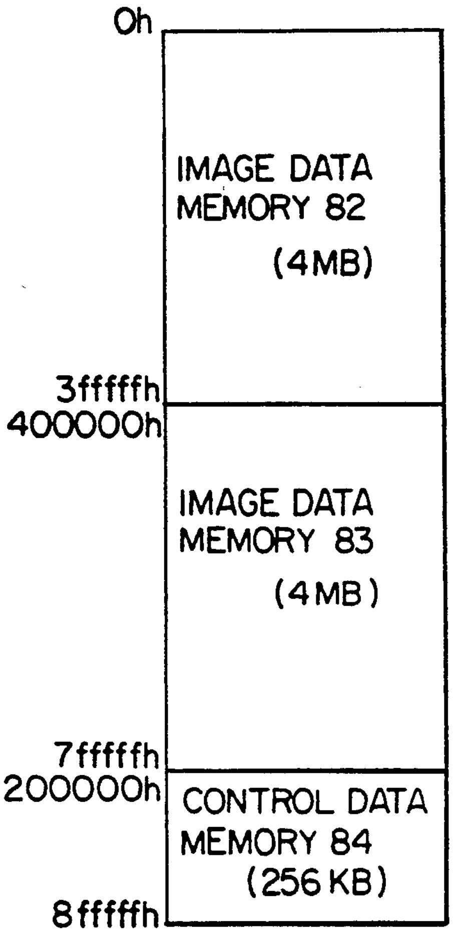
FIG. 9 PRIOR ART
FIG. 9 is a memory map of the prior art image data memory device of FIG. 8.
Figure 8:
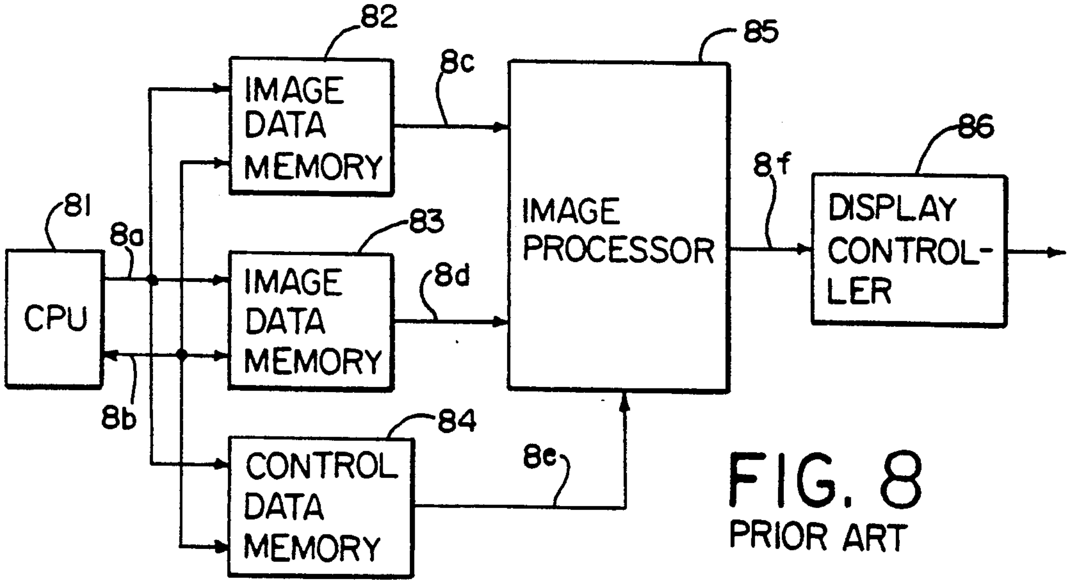
FIG. 8 PRIOR ART
FIG. 8 is a block diagram illustrating another prior art image data memory device.
Figure 10A:
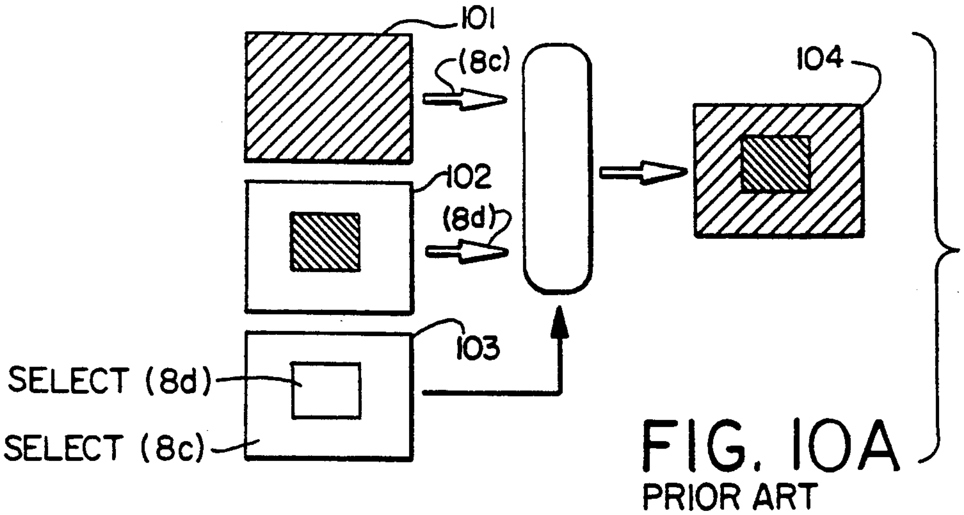
FIG. 10A PRIOR ART
FIGS. 10(*a*)–10(*c*) are diagram illustrating the process of moving image data in the prior art image data memory device of FIG. 8.
Figure 10B:
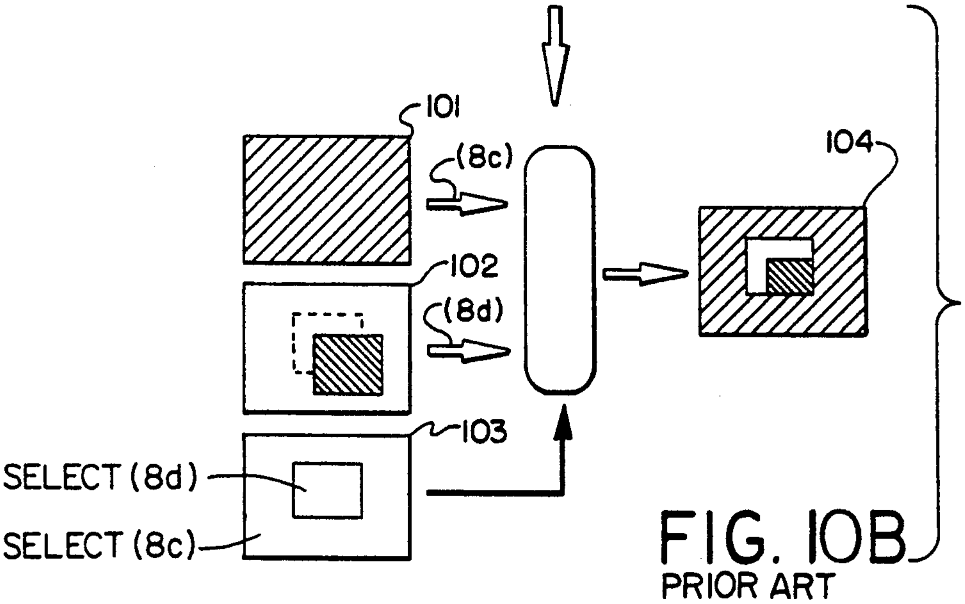
FIG. 10B PRIOR ART
Figure 10C:
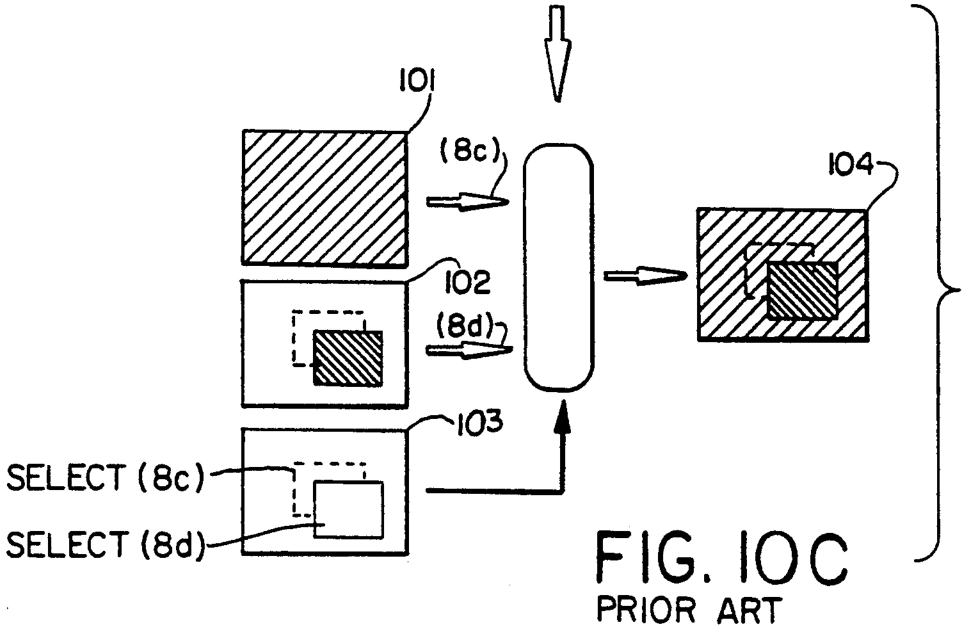
FIG. 10C PRIOR ART

Referring to FIG. 5, the manner of processing the image data stored in the image data memories 12 and 13 to be displayed in accordance with the control data stored in the control data memory 14 will be described.

The image data shown by image data memory contents 51 and 52 in FIG. 5 are stored in the image data memories 12 and 13, respectively. The control data listed in Table 1 are stored in the control data memory 14 as shown by control data memory contents 53. Data stored in the image data memories 12 and 13 and the control data memory 14 are sequentially read out, pixel by pixel, onto the image output signals 1*c* and 1*d* and the control data output signal 1*e*, and are input to the image processor 16. The image processor 16 processes the contents of the image output signals 1*c* and 1*d* according to the contents of the control data output signal 1*e* in accordance with the processes listed in Table 1.

When the image data in the upper left block, shown in FIG. 5, of the image data memories 12 and 13 are respectively output on the image output signals 1*c* and 1*d*, the control data memory 14 outputs the control data "0" on the control data output signal 1*e* to select the image output signal 1*c*. When the image output signals 1*c* and 1*d* and the control data output signal 1*e* are input to the image processor 16, the image processor 16 (indicated by a block 54 in FIG. 5) selects the contents of the image output signal 1*c* (i.e. the image data stored in the image data memory 12) to be directly output on the processed image signal 1*g*.

When the image data in the upper right block, shown in FIG. 5, of the image data memories 12 and 13 are respectively output on the image output signals 1*c* and 1*d*, the control data memory 14 outputs the control data "2" on the control date output signal 1*e* to direct the OR operation of the image output signals 1*c* and 1*d*. When the image output signals 1*c* and 1*d* and the control data output signal 1*e* are input to the image processor 16, the image processor 16 performs the OR operation on the two image data supplied via the image output signals 1*c* and 1*d* and outputs the ORed result on the processed image signal 1*g*.

When the image data in the lower right block, shown in FIG. 5, of the image data memories 12 and 13 are respectively output on the image output signals 1*c* and 1*d*, the control data memory 14 outputs the control data "3" on the control data output signal 1*e* to direct the AND operation of the image output signals 1*c* and 1*d*. When the image output signals 1*c* and 1*d* and the control data output signal 1*e* are input to the image processor 16, the image processor 16 takes the overlapping portion of the two image data supplied via the image output signals 1*c* and 1*d* and outputs the result on the processed image signal 1*g*.

The image processor 16 outputs the result of the above-described processing onto the processed image signal 1*g* to supply it to the display controller 17 which converts it into a signal suitable for use in an image display apparatus.

The above description has dealt with the read/write operations of the image data memory device of the invention for reading out and writing the image data and control data in the image data memories and control data memory, as well as the operations of the image processor with respect to the data stored in the image data memories and control data memory. We will now describe how the output of the image processor, i.e. the display image, changes when image data and its control data are written to the image data memory device.

In the upper left block of the display image data 55 after the image processing shown in FIG. 5, is displayed the contents of the image data memory 12, i.e. the image output signal 1*c*. This means that the control data "0" is set in the upper left block of the control data memory 14. Let us now consider the situation where new image data is written into the left upper block of the image data memory 13 and the image processor 16 is made to select the new data for display. To achieve this, first the control data "1" is entered from the central processing unit 11 to the control data register 15 in the same manner as described above. Then, the new image data is written into the upper left block of the image data memory 13 in the same manner as described above. At the same time data write for one pixel is performed, the new control data "1" is written to the same coordinates in the control data memory 14. Upon writing the image data, the image data memory 13 outputs the new image data onto the image output signal 1*d*, while the control data memory 14 outputs the new control data "1" onto the control data output signal 1*e*. This changes the type of the processing to be performed by the image processor 16 which now selects the image data written into the image data memory 13 and outputs it for display. Since the control data can be changed only by writing the image data, the function of the image processor 16 can be changed at the same time when the image data is written.

Figure 11A:
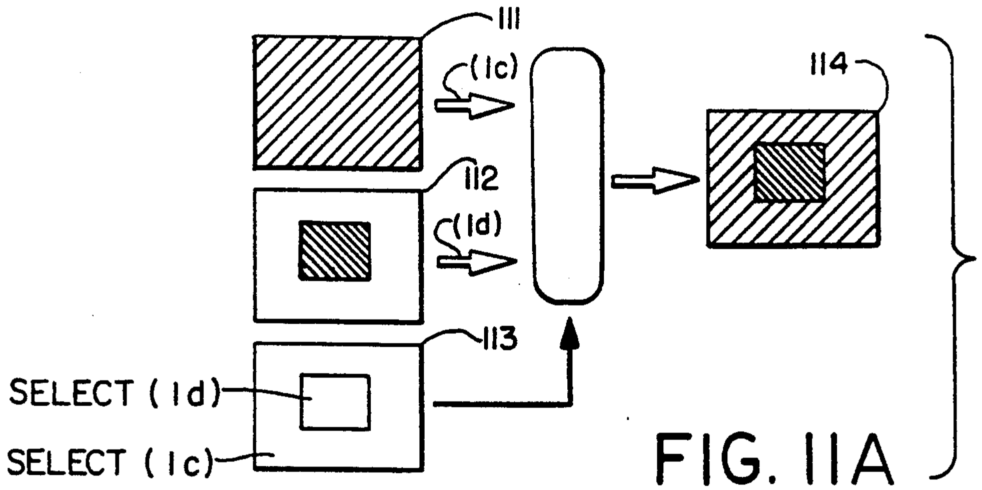
FIGS. 11(*a*)–11(*c*) are diagram illustrating the process of moving image data in the image data memory device of FIG. 1.
Figure 11B:
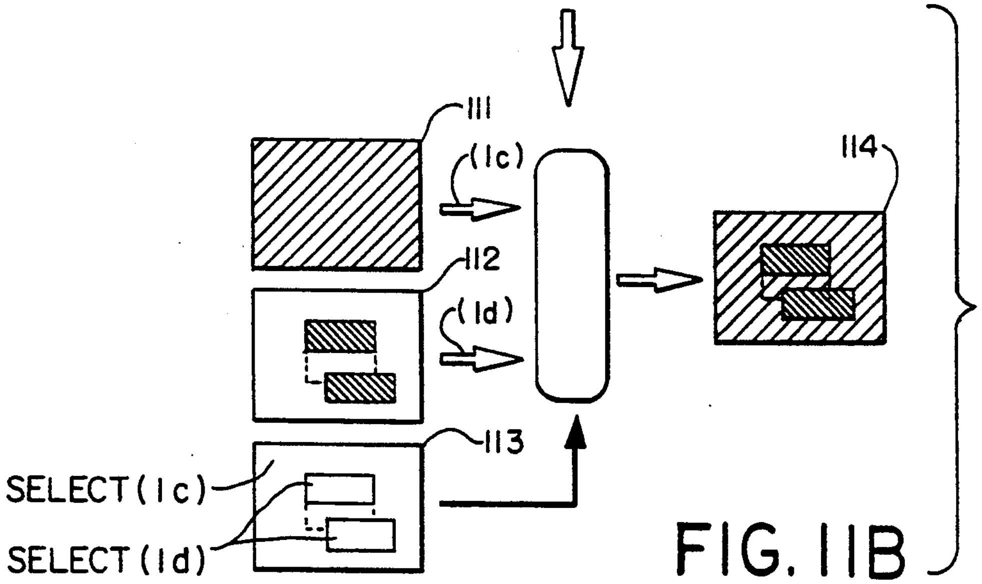
Figure 11C:
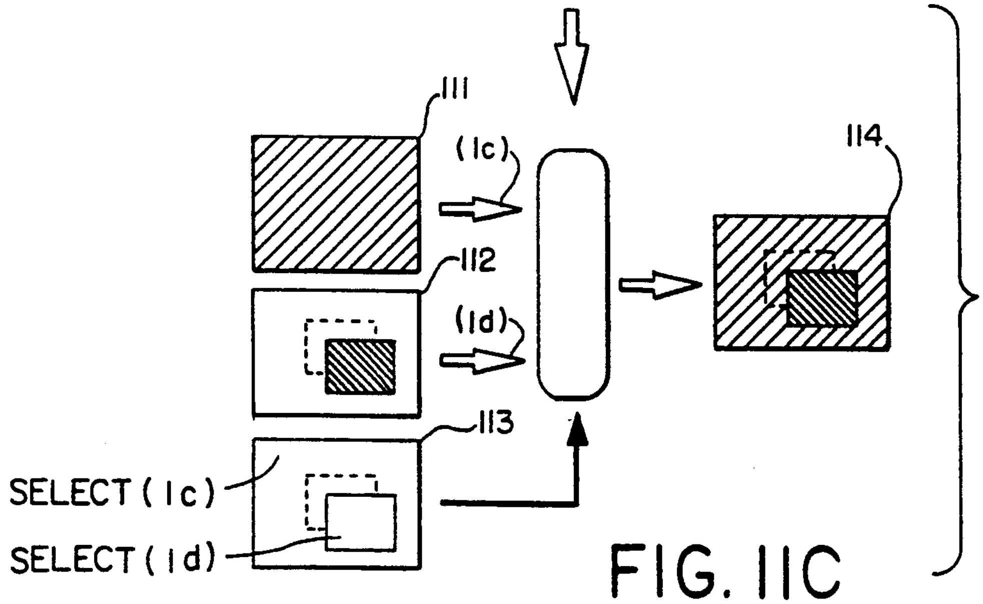

In order to demonstrate the effect of the above-mentioned f unction of the embodiment, the operation of moving image data and control data corresponding thereto will be described. It is assumed that the contents of the image data memories 12 and 13 and control data memory 14 are as indicated by blocks 111113 113 shown in (a) of FIG. 11, and, in the processed image, the image stored in the image data memory 13 is displayed in the rectangular area of the image stored in the image data memory 12. The rectangular area of the image stored in the image data memory 13 (which is displayed in the processed image) and also the control data indicative of selecting the image data memory 13 (i.e., the image output signal 1*d*) and stored in the control data memory 14 are moved, so that the image data which is moved in the image data memory 13 remains displayed in the processed image. According to the embodiment, as described above, at the same time the image data is moved to certain coordinates in the image data memory 13, the control data corresponding to that image data is moved in the control data memory 14 to the same coordinates as the certain coordinates. This causes the contents of the image data memory 13 and control data memory 14 and the display during the movement of the image data to be as shown in (b) of FIG. 11 in which the contents of the display (block 114) exactly reflect the image data in the way of movement. Finally, the contents of the image data memory 13 and control data memory 14 are moved as shown in (c) of FIG. 11 to complete the movement.

By accomplishing such an operation, the type of processing can be changed simultaneously with the change of an image data. According to the embodiment, therefore, the change in the display caused by the changes of an image data and the processing type Is smoothly conducted and the display is easy to view, as compared with the prior art configuration in which writing of an image data memory and that of a control data memory must be conducted in sequence.

Another embodiment of the invention will be described. This embodiment can be configured in the same manner as the embodiment of FIG. 1, but the manner of moving image data in the image data memories 12 and 13 is different. Namely, according to this embodiment, when an image data is read out from the image data memory 12 or 13, the control data is not read out from the control data memory 14 onto the control data setting signal 1*f*, while in the embodiment of FIG. 1 the control data is read out from the control data memory 14 onto the control data setting signal 1*f* to be stored in the control data register 15, simultaneously with reading of an image data from the image data memory.

In this embodiment, when an image data is moved in the image data memory 12 while making the image data correspond to new given control data, the following operations are performed. First, the central processing unit 11 outputs as the image data signal 1*b* a control data to be set, and directs via the image address signal 1*a* the writing of the control data register 15, thereby storing the control data into the control data register 15. Then, the central processing unit 11 specifies via the image address signal 1*a* the coordinates. An image data is read out from the specified coordinates of the image date memory 12, and at this time the image data is input to the central processing unit 11 as the image data signal 1*b*. The central processing unit 11 outputs as the image address signal 1*a* the destination coordinates, and simultaneously the read out image data is input via the image data signal 1*b* to the image data memory 12. This causes the previously read out image data to be written into the destination coordinates. At the same time, the control data memory 14 receives via the control data setting signal 1*f* the stored contents of the control data register 15 (i.e., the control data which will newly correspond to the image data) which is then stored at the same coordinates as the image data.

According to this embodiment, therefore, the successive movement of an image data can be performed by repeatedly reading out the image data from the image data memory 12 and writing the image data into the image data memory. When an image data is continuously moved, a new given control data can be set in the control data memory 14 while making the control data correspond to the image data to be moved, without considering the control data memory 14.

As seen from above, when successively writing image data with the same control data into the image data memory or when moving image data together with its control data within the image data memory, the control data is written into the control data memory at the same time that the image data is written into the image data memory. This prevents the drawing speed from dropping because of the operation of writing the control data to the control data memory, and since read/write operations can be performed with respect to the proper coordinates in the control date memory only by reading out or writing in the image data, the configuration of the present invention serves to simplify software management of the control data memory.

Also, since the control data memory is provided separately from the image data memory, the problem of reducing the number of colors available for image display can also be avoided. Furthermore, since the image data and control data can be rewritten simultaneously, the type of image processing operation can be specified at the same time that the image data is written, thereby making the change in the display of the operation result smooth and the display easy to view when the image data and the type of operation are changed simultaneously as compared when the image data and control data are sequentially written independently of each other.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What in claimed is:

1. In an image data memory device for a computer system in which an image address signal and an image data signal are generated, said image data memory device comprises:

a plurality of image data storing means for receiving said image address signal and said image data signal, and for, when said image address signal indicates writing of an image data and writing address, storing an image data on said image data signal at said writing address specified by said image address signal, and for, when said image address signal indicates reading an image data and reading address, reading out an image data from said reading address specified by said image address signal, and outputting said read out image data as an image data output signal;

first control date storing means for receiving said image address signal, and for, when said image address signal indicates writing of an image data and writing address, storing a process control data on a process control data signal at said writing address specified by said image address signal, and for sequentially outputting stored process control data as a process control data output signal;

second control data storing means for receiving said image address signal and said image data signal, and for storing at least one process control data, and for, when said image address signal indicates writing a data into one of said image data storing means, outputting a stored process control data as said process control data signal, and for, when said image address signal indicates writing a data into said second control data storing means, storing a process control data on said image data signal; and image processing means for receiving said image data output signals from said plurality of image data storing means, and said process control data output signal, and for processing image data on said image data output signals in accordance with the contents of said process control data output signal, and for outputting a processed image data as a processed image data signal.

2. An image data memory device according to claim 1, wherein said image address signal and image data signal are generated by a central processing unit of the computer system.

3. An image data memory device according to claim 1, wherein said image data memory device further comprises display control means for receiving said processed image data signal, and for converting said processed image data signal into a control signal suitable for a display apparatus, and for outputting said control signal.

4. An image data memory device according to claim 1, wherein said image processing means adds two or more received image data output signals at the ratio indicated by said process control data output signal, and outputs the result as said processed image data signal.

5. An image data memory device according to claim 1, wherein said image processing means selects one of two or more received image data output signals in accordance with said process control data output signal, and outputs the selected image data output signal as said processed image data signal.

6. In an image data memory device for a computer system in which an image address signal and an image data signal are generated, said image data memory device comprises:

a plurality of image data storing means for receiving said image address signal and said image data signal, and or, when said image address signal indicates writing of an image data and writing address, storing an image data on said image data signal at said writing address specified by said image address signal, and for, when said image address signal indicates reading an image data and reading address, reading out an image data from said reading address specified by said image address signal, and outputting said read out image data as an image data output signal;

first control data storing means for receiving said image address signal, and for, when said image address signal indicates writing of an image data and writing address, storing a process control data on a process control data signal at said writing address specified by said image address signal, and for, when said image address signal indicates reading of an image data and reading address, reading out a process control data from said reading address, and for outputting said read out process control data as a process control data output signal and process control data signal;

second control data storing means for receiving said image address signal and said image data signal, and for storing at least one process control data, and for, when said image address signal indicates writing a data into one of said image data storing means, outputting a stored process control data as said process control data signal, and for, when said image address signal indicates writing a data into said second control data storing means, storing a process control data on said image data signal, and for, when said image address signal indicates reading of an image data and reading address, storing a process control data on said process control data signal from said first control data storing means; and image processing means for receiving said image data output signals from said plurality of image data storing means, and said process control data output signal, and for processing image data on said image data output signals in accordance with the contents of said process control data output signal, and for outputting a processed image data as a processed image data signal.

7. An image data memory device according to claim 6, wherein said image address signal and image data signal are generated by a central processing unit of the computer system.

8. An image data memory device according to claim 6, wherein said image data memory device further comprises display control means for receiving said processed image data signal, and for converting said processed image data signal into a control signal suitable for a display apparatus, and for outputting said control signal.

9. An image date memory device according to claim 6, wherein said image processing means adds two or more received image data output signals at the ratio indicated by said process control data output signal, and outputs the result as said processed image data signal.

10. An image data memory device according to claim 6, wherein said image processing means selects one of two or more received image data output signals in accordance with said process control data output signal, and outputs the selected image data output signal as said processed image data signal.

11. An image data memory device for a computer system in which an image address signal and an image data signal are received and a processed image data signal is generated, said image data memory device comprising:

a plurality of image data storing means for receiving said image address signal and said image data signal, and for, when said image address signal indicates writing of an image data into said one of said image data storing means and writing address, storing an image data on said image data signal at said writing address specified by said image address signal, and for, when said image address signal indicates reading an image data from one of said image data storing means and reading address, reading out an image data from said reading address specified by said image address signal, and outputting said read out image data as an image data output signal and an image data signal;

first control data storing means for receiving said image address signal, and for, when said image address signal indicates writing of an image data into one of said image data storing means and writing address, receiving and storing a process control data on a process control data signal corresponding to said image data at said writing address, and for, when said image address signal indicates reading of an image data from one of said image data storing means and reading address, reading out a process control data corresponding to said image data at said reading address and for outputting said read out process control data as a process control data output signal and process control data signal;

second control data storing means for receiving said image address signal and said image data signal, and for storing at least one process control data, and for, when said image address signal indicates writing an image data into one of said image data storing means and writing address, outputting a stored process control data corresponding to said image data at said writing address as said process control data signal, and for, when said image address signal indicates writing a process control data into said second control data storing means and writing address, receiving and storing a process control data on said image data signal, and for, when said image address signal indicates reading of an image data from one of said image data storing means and reading address, receiving and storing a process control data on said process control data signal corresponding to said image data at said reading address from said first control data storing means; and image processing means for receiving said image data output signals from said plurality of image data storing means and said process control data output signal from said first control data storing means, and for processing image data on said image data output signals in accordance with the contents of said process control data output signal, and for outputting a processed image data as a processed image data signal.

12. An image data memory device for a computer system in which an image address signal and an image data signal are received and a processed image data signal is generated, said image data memory device comprising:

a plurality of image data storing means for receiving said image address signal and said image data signal, and for, when said image address signal indicates writing of an image data into said one of said image data storing means and writing address, storing an image data on said image data signal at said writing address specified by said image address signal, and for, when said image address signal indicates reading an image data from one of said image data storing means and reading address, reading out an image data from said reading address specified by said image address signal, and outputting said read out image data as an image data output signal and an image data signal;

first control data storing means for receiving said image address signal, and for, when said image address signal indicates writing of an image data into one of said image data storing means and writing address, receiving and storing a process control data on a process control data signal corresponding to said image data at said writing address, and for sequentially outputting stored process control data as a process control data output signal and process control data signal;

second control data storing means for receiving said image address signal and said image data signal, and for storing at least one process control data, and for, when said image address signal indicates writing an image data into one of said image data storing means and writing address, outputting a stored process control data corresponding to said image data at said writing address as said process control data signal, and for, when said image address signal indicates writing a process control data into said second control data storing means and writing address, receiving and storing a process control data on said image data signal; and image processing means for receiving said image data output signals from said plurality of image data storing means and said process control data output signal from said first control data storing means, and for processing image data on said image data output signals in accordance with the contents of said process control data output signal, and for outputting a processed image data as a processed image data signal.

* * * * *